US012700702B2

(12) United States Patent
Daughtry et al.

(10) Patent No.: US 12,700,702 B2
(45) Date of Patent: Aug. 4, 2026

(54) CABLE CARD ASSEMBLY OF AN ELECTRICAL CONNECTOR HAVING CAPACITORS

(71) Applicant: TE Connectivity Solutions GmbH, Schaffhausen (CH)

(72) Inventors: Earl Daughtry, Middletown, PA (US); Richard Elof Hamner, Hummelstown, PA (US); Matthew Jeffrey Sypolt, Harrisburg, PA (US); Justin Dennis Pickel, Hummelstown, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 613 days.

(21) Appl. No.: 18/300,932

(22) Filed: Apr. 14, 2023

(65) Prior Publication Data

US 2024/0347982 A1 Oct. 17, 2024

(51) Int. Cl.
*H01R 13/6593* (2011.01)
*H01R 12/72* (2011.01)
*H01R 13/66* (2006.01)

(52) U.S. Cl.
CPC ....... *H01R 13/6593* (2013.01); *H01R 12/721* (2013.01); *H01R 13/6625* (2013.01)

(58) Field of Classification Search
CPC ............ H01R 13/6593; H01R 13/6625; H01R 12/721
USPC ....................................................... 439/607.4
See application file for complete search history.

(56) References Cited

U.S. PATENT DOCUMENTS 6,168,469 B1 1/2001 Lu
6,380,485 B1 * 4/2002 Beaman ............. H01R 13/6589 439/497
6,995,629 B2 * 2/2006 Nishimura ........... H05K 1/0246 333/32
7,285,018 B2 10/2007 Kenny et al.
7,540,781 B2 6/2009 Kenny et al.
7,607,948 B1 * 10/2009 Lee .................. H01R 13/65912 439/620.22
(Continued)

FOREIGN PATENT DOCUMENTS

CN 201282247 Y * 7/2009
CN 103650256 B * 4/2017 ............. H01R 12/53
(Continued)

*Primary Examiner* — Abdullah A Riyami

(57) ABSTRACT

A cable card assembly for an electrical connector includes a circuit card having circuit conductors defining signal transmission paths through the circuit card. The circuit conductors include cable pads at the cable end and capacitor pads adjacent the corresponding cable pads. The cable card assembly includes twin axial cables electrically coupled to the circuit card. Each twin axial cable includes a pair of signal conductors and a cable shield surrounding the pair of signal conductors to provide electrical shielding for the corresponding signal conductors. The signal conductors configured to be electrically connected to the circuit conductors of the circuit card. The twin axial cable extending along a cable axis. The cable card assembly includes capacitors coupled to the circuit card. Each capacitor is connected between the corresponding cable pad and the corresponding capacitor pad. The capacitor is oriented perpendicular to the corresponding cable axis.

20 Claims, 4 Drawing Sheets

(56) References Cited

U.S. PATENT DOCUMENTS

| | | | | |
|---|---|---|---|---|
| 7,670,147 | B1 * | 3/2010 | Lee | H05K 1/162 439/620.09 |
| 7,887,371 | B2 | 2/2011 | Kenny et al. | |
| 8,123,563 | B2 | 2/2012 | Kenny et al. | |
| 8,267,718 | B2 * | 9/2012 | Straka | H01R 13/6593 439/497 |
| 8,632,357 | B2 * | 1/2014 | Straka | H01R 13/6593 439/607.09 |
| 8,840,432 | B2 * | 9/2014 | Alden, III | H05K 1/0216 439/607.46 |
| 8,902,605 | B2 * | 12/2014 | Buschel | H01R 12/58 361/772 |
| 8,979,553 | B2 * | 3/2015 | Lloyd | H01R 13/502 439/76.1 |
| 9,373,915 | B1 * | 6/2016 | Schulz | H01R 13/6461 |
| 9,595,792 | B2 * | 3/2017 | Nishimura | H01R 13/6473 |
| 9,748,696 | B2 * | 8/2017 | Nishimura | H01R 13/6469 |
| 9,774,113 | B2 * | 9/2017 | Zhang | H01R 12/62 |
| 10,170,874 | B1 * | 1/2019 | Costello | H01R 12/00 |
| 10,178,762 | B2 * | 1/2019 | Janssen | H05K 1/025 |
| 2006/0166525 | A1 * | 7/2006 | Yamakami | G01R 31/58 439/67 |
| 2020/0244010 | A1 * | 7/2020 | Chua | H01R 13/629 |

FOREIGN PATENT DOCUMENTS

| | | | | | |
|---|---|---|---|---|---|
| JP | 2010211937 | A | * | 9/2010 | |
| JP | 2010267484 | A | * | 11/2010 | |
| WO | WO-2004023605 | A1 | * | 3/2004 | H01R 13/6658 |
| WO | WO-2010011753 | A1 | * | 1/2010 | H05K 1/181 |
| WO | WO-2023283297 | A1 | * | 1/2023 | H02G 1/14 |

* cited by examiner

CABLE CARD ASSEMBLY OF AN ELECTRICAL CONNECTOR HAVING CAPACITORS

BACKGROUND OF THE INVENTION

The subject matter herein relates generally to electrical connectors.

Electrical connectors are typically used to electrically couple various types of electrical devices to transmit signals between the devices. At least some known cable assemblies include twin axial cables between electrical connectors, which are connected to corresponding electrical devices. The twin axial cables each have a signal conductor, or a differential pair of signal conductors surrounded by a shield layer that, in turn, is surrounded by a cable jacket. The shield layer includes a conductive foil, which functions to shield the signal conductor(s) from electromagnetic interference (EMI) and generally improve performance. A drain wire may be provided within the cable, electrically connected to the conductive foil. At an end of the communication cable, the cable jacket, the shield layer, and insulation that covers the signal conductor(s) may be removed (e.g., stripped) to expose the signal conductor(s) and the drain wire. The exposed portions of the signal conductor(s) are then mechanically and electrically coupled (e.g., soldered) to corresponding conductors, such as signal pads of a circuit card. The exposed portions are bent and manipulated between the insulator and the signal pads on the circuit card.

However, at high speeds, signal integrity and electrical performance of the electrical connectors is difficult to maintain. For example, controlling impedance and losses along the signal transmission lines is difficult. Some known systems use capacitors along the signal transmission lines to isolate DC voltages. However, design of the circuit card to include circuits to accommodate the capacitors is difficult and lengthens the overall signal transmission lines. Moreover, incorporation of the capacitors in shielded systems becomes difficult to design and locate within the shielding components in the system. For example, the size of the shield tends to be relatively large to accommodate all of the components and resonance control within the shielded cavity can be difficult.

Accordingly, there is a need for an electrical connector having an improved connection interface with a circuit card.

BRIEF DESCRIPTION OF THE INVENTION

In one embodiment, a cable card assembly for an electrical connector is provided and includes a circuit card having an upper surface and a lower surface. The circuit card has a cable end and a mating end. The circuit card has circuit conductors defining signal transmission paths through the circuit card. Each circuit conductor includes a cable pad at the cable end and a capacitor pad adjacent the corresponding cable pad. The cable card assembly includes twin axial cables electrically coupled to the circuit card. Each twin axial cable includes a pair of signal conductors and a cable shield surrounding the pair of signal conductors to provide electrical shielding for the corresponding signal conductors. The signal conductors are configured to be electrically connected to the circuit conductors of the circuit card. The twin axial cable extends along a cable axis. The cable card assembly includes capacitors coupled to the circuit card. Each capacitor is connected between the corresponding cable pad and the corresponding capacitor pad. The capacitor is oriented perpendicular to the corresponding cable axis.

In another embodiment, a cable card assembly for an electrical connector is provided and includes a circuit card having an upper surface and a lower surface. The circuit card has a cable end and a mating end. The circuit card has circuit conductors defining signal transmission paths through the circuit card. Each circuit conductor includes a cable pad at the cable end and a capacitor pad adjacent the corresponding cable pad. The circuit card has a ground plane. The cable card assembly includes twin axial cables electrically coupled to the circuit card. Each twin axial cable includes a pair of signal conductors and a cable shield surrounding the pair of signal conductors to provide electrical shielding for the corresponding signal conductors. The signal conductors are configured to be electrically connected to the circuit conductors of the circuit card. The twin axial cable extends along a cable axis. The cable card assembly includes a ground bus mounted to the circuit card. The ground bus is electrically connected to the cable shields to electrically connect the cable shields of the twin axial cables. The ground bus is electrically connected to the ground plane of the circuit card. The ground bus includes a shell that has pockets and separating walls between the pockets. Each pocket receives an end of the corresponding twin axial cable. The separating walls provide shielding between the ends of the twin axial cables. The cable card assembly includes capacitors coupled to the circuit card in the pockets. Each capacitor is connected between the corresponding cable pad and the corresponding capacitor pad. The capacitors are surrounded by the shell to provide shielding for the capacitors.

In a further embodiment, an electrical connector is provided and includes a housing having walls forming a cavity. The housing has a mating end configured to be mated with a second electrical connector. The electrical connector assembly includes a cable card assembly received in the cavity of the housing. The cable card assembly includes a circuit card. Twin axial cables are electrically connected to the circuit card, capacitors are electrically connected to the circuit card, and a ground bus is coupled to the circuit card over the ends of the twin axial cables and the capacitors to provide electrical shielding for the twin axial cables and the capacitors. The circuit card has an upper surface and a lower surface. The circuit card has a cable end and a mating end. The circuit card has circuit conductors defining signal transmission paths through the circuit card. Each circuit conductor includes a cable pad at the cable end and a capacitor pad adjacent the corresponding cable pad. The circuit card has a ground plane. Each twin axial cable includes a pair of signal conductors and a cable shield surrounding the pair of signal conductors to provide electrical shielding for the corresponding signal conductors. The signal conductors are configured to be electrically connected to the circuit conductors of the circuit card. The ground bus is electrically connected to the cable shields to electrically connect the cable shields of the twin axial cables. The ground bus is electrically connected to the ground plane of the circuit card. The ground bus includes a shell having pockets and separating walls between the pockets. Each pocket receives an end of the corresponding twin axial cable and the corresponding capacitors. The separating walls provide shielding between each pair of conductors of the twin axial cables and the respective capacitors. Each capacitor is connected between the corresponding cable pad and the corresponding capacitor pad.

DETAILED DESCRIPTION OF THE INVENTION

Figure 1:
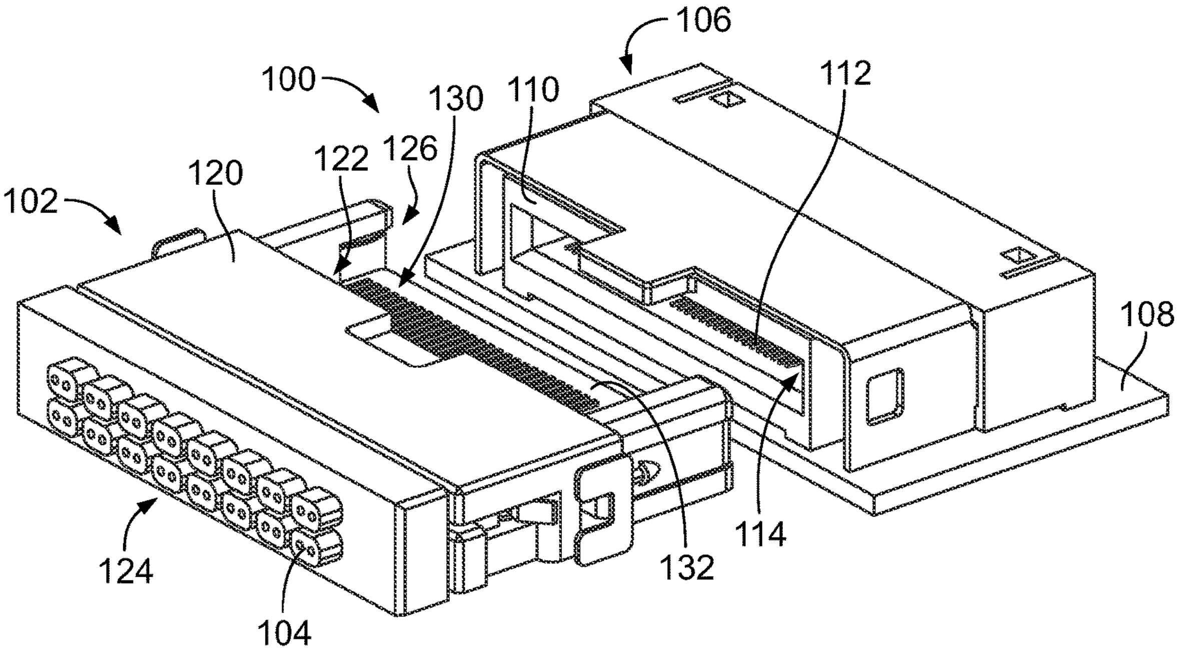
FIG. 1 is a perspective view of a communication system in accordance with an exemplary embodiment.

FIG. 1 is a perspective view of a communication system 100 in accordance with an exemplary embodiment. The communication system 100 includes a first electrical connector 102 provided at ends of twin axial cables 104 and a second electrical connector 106. In the illustrated embodiment, the second electrical connector 106 is mounted to a circuit board 108. In other various embodiments, the second electrical connector 106 may be provided at ends of twin axial cables (not shown).

In an exemplary embodiment, the second electrical connector 106 is a receptacle connector. The second electrical connector 106 may be a card edge connector having a card slot. In other embodiments, the second electrical connector 106 may be a socket connector. In an exemplary embodiment, the first electrical connector 102 is a plug connector configured to be pluggably coupled to the second electrical connector 106. For example, a portion of the first electrical connector 102 may be plugged into a receptacle of the second electrical connector 106. In an exemplary embodiment, the first electrical connector 102 is coupled to the second electrical connector 106 at a separable interface. For example, the first electrical connector 102 is latchably coupled to the second electrical connector 106. The connectors 102, 106 may be input-output (I/O) connectors.

The second electrical connector 106 includes a receptacle housing 110 holding an array of contacts 112. In an exemplary embodiment, the receptacle housing 110 includes an opening 114 that receives the first electrical connector 102. The opening 114 may be a card slot configured to receive a circuit card. The opening 114 is located at the front of the receptacle housing 110 in the illustrated embodiment. Other locations are possible in alternative embodiments, such as at the top. The contacts 112 have separable mating interfaces. The contacts 112 may define a compressible interface, such as including deflectable spring beams that are compressed when the first electrical connector 102 is received in the opening 114. Optionally, the contacts 112 may be arranged in multiple rows along the top and the bottom of the opening 114. In various embodiments, the second electrical connector 106 is a communication device, such as a card edge socket connector. However, the second electrical connector 106 may be another type of electrical connector in an alternative embodiment. The second electrical connector 106 may be a high-speed connector.

The first electrical connector 102 includes a housing 120 having a cavity 122 that receives a cable card assembly 130. The housing 120 has a cable end 124 and a mating end 126 opposite the cable end 124. The twin axial cables 104 extend from the cable end 124. The mating end 126 is configured to be coupled to the second electrical connector 106. In the illustrated embodiment, the cable end 124 is at the rear of the housing 120 and the mating end 126 is at the front of the housing 120. Other locations are possible in alternative embodiments, including having the mating end 126 perpendicular to the cable end 124. The cable card assembly 130 includes a circuit card 132. The twin axial cables 104 are configured to be electrically connected to the circuit card 132. For example, conductors of the twin axial cables 104 may be terminated directly to the circuit card 132 or may be electrically connected to the circuit card 132 using contacts. The circuit card 132 is configured to be plugged into the opening 114 when the first electrical connector 102 is mated with the second electrical connector 106. For example, an edge of the circuit card 132 may be plugged into a card slot of the receptacle housing 110.

Figure 2:
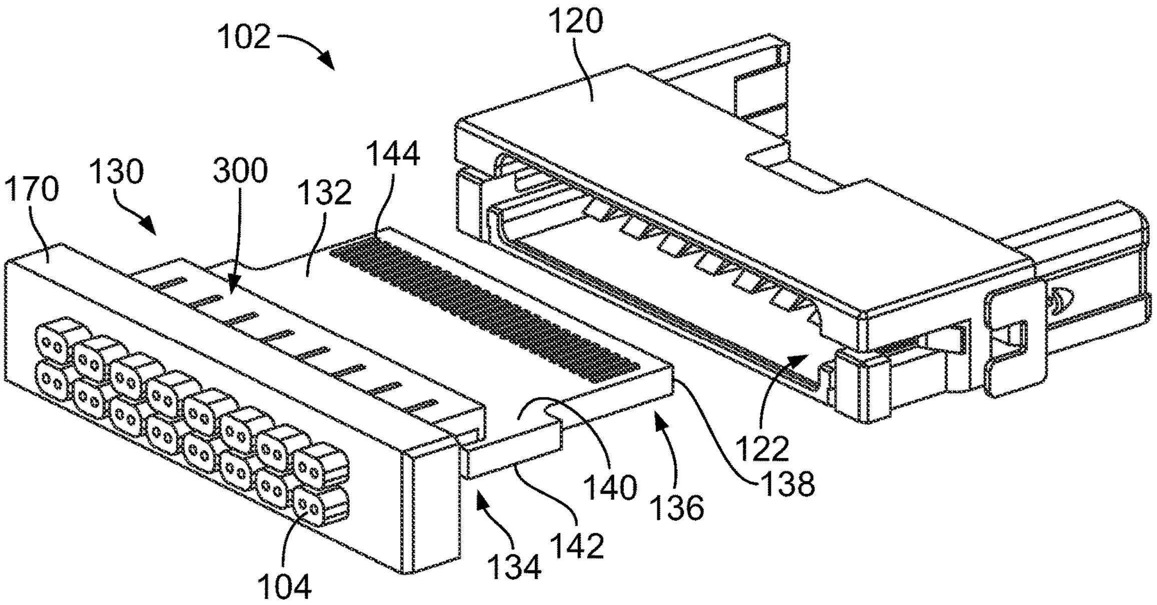
FIG. 2 is an exploded view of the first electrical connector in accordance with an exemplary embodiment.

FIG. 2 is an exploded view of the first electrical connector 102 in accordance with an exemplary embodiment. The first electrical connector 102 includes the housing 120 and the cable card assembly 130. The housing 120 receives the cable card assembly 130 in the cavity 122 to hold the circuit card 132 and the twin axial cables 104. In an exemplary embodiment, the cable card assembly 130 includes a ground bus 300 providing shielding for the twin axial cables 104. The ground bus 300 electrically commons the twin axial cables 104 with each other and with a ground plane of the circuit card 132. Optionally, the cable card assembly 130 may include a contact assembly having an array of contacts that are electrically connected between the twin axial cables 104 and the circuit card 132. However, in alternative embodiments, the cable card assembly 130 may be provided without the contact assembly and/or without the ground bus 300. Rather, the twin axial cables 104 may be terminated directly to the circuit card 132 without the contact assembly and/or the ground bus 300.

The ground bus 300 provides electrical shielding for the signal conductors of the twin axial cables 104 (and for the signal contacts of the contact assembly when utilized). The ground bus 300 is electrically connected to the shield structures of the twin axial cables 104, such as to cable shields of the twin axial cables 104 and/or drain wires of the twin axial cables 104. In an exemplary embodiment, the ground bus 300 is soldered to the cable shields. However, the ground bus 300 may be electrically connected to the shield structures of the twin axial cables 104 by other means in alternative embodiments, such as soldering to the drain wires, welding to the drain wires, press-fitting the drain wires into a compliant feature of the ground bus 300, using conductive adhesive, using a conductive tape or braid, using a conductive gasket, conductive foam, conductive epoxy, and the like. The ground bus 300 may be coupled to the circuit card 132 at a solderless connection, such as at an interference or press-fit connection. In various embodiments, multiple ground busses 300 may be provided, such as at the top side and/or the bottom sides of the circuit card 132. The multiple ground busses 300 may be offset, such as shifted front-to-rear and/or side-to-side.

During assembly, the twin axial cables 104 are electrically connected to the circuit card 132, such as by soldering the conductors to circuit conductors of the circuit card (or by soldering to contacts of the contact assembly when utilized). The cable card assembly 130, including the circuit card 132, the twin axial cables 104, and the ground bus 300, may be loaded into the housing 120, such as into a rear of the housing 120. The cable card assembly 130 may be secured in the housing 120 using latches, fasteners or other securing devices. In an exemplary embodiment, the ends of the twin axial cables 104 may be surrounded by a strain relief element 170. For example, the strain relief element 170 may be molded or otherwise formed around the twin axial cables 104. The strain relief element 170 may be secured to the circuit card 132, such as being molded to the circuit card 132. Optionally, multiple strain relief elements 170 may be provided, such as upper and lower strain relief elements.

In various embodiments, the cable card assembly 130 may have a single row of twin axial cables 104 on the top side and a single row of twin axial cables 104 connected to the bottom side of the circuit card 132. However, the cable card assembly 130 may include multiple rows of twin axial cables 104 on the top side and/or the bottom side.

The circuit card 132 extends between a cable end 134 (for example, rear portion) and a mating end 136 (for example, front portion). The circuit card 132 has a rear edge (not shown) at the cable end 134 and the twin axial cables are configured to be coupled to the circuit card 132 at the cable end 134 and extend rearward from the circuit card 132. The circuit card 132 has a card edge 138 at the front of the mating end 136 configured to be plugged into the opening 114 (shown in FIG. 1) of the second electrical connector 106 (shown in FIG. 1). The circuit card 132 includes an upper surface 140 and a lower surface 142. The circuit card 132 may have any reasonable length between the cable end 134 and the mating end 136, depending on the particular application, and may have electrical components mounted to the circuit card 132 between the cable end 134 and the mating end 136.

The circuit card 132 includes circuit conductors 144, such as pads, traces, vias, and the like. In an exemplary embodiment, the circuit conductors 144 are provided at the cable end 134 for connection to the twin axial cables 104 (or the contact assembly when utilized) and at the mating end 136 for connection to the second electrical connector 106. The circuit conductors 144 may be provided on multiple layers of the circuit card 132 and extend through the layers using vias. The circuit conductors 144 at the mating end 136 define mating conductors configured to be electrically connected to corresponding contacts 112 (shown in FIG. 1) of the second electrical connector 106. The mating conductors are provided proximate to the card edge 138. However, in alternative embodiments, the mating end 136 is defined by the bottom of the circuit card 132 and the mating conductors are provided only on the lower surface 142, such as for mating with socket contacts of a socket connector. The circuit conductors 144 at the cable end 134 are configured to be electrically connected to the signal conductors of the twin axial cables 104 and/or the ground bus 300. The circuit conductors 144 may be provided at both the upper surface 140 and the lower surface 142. The circuit conductors 144 may include both signal conductors and ground conductors of the circuit card 132. Optionally, the circuit conductors 144 may be arranged in a ground-signal-signal-ground arrangement.

Figure 3:
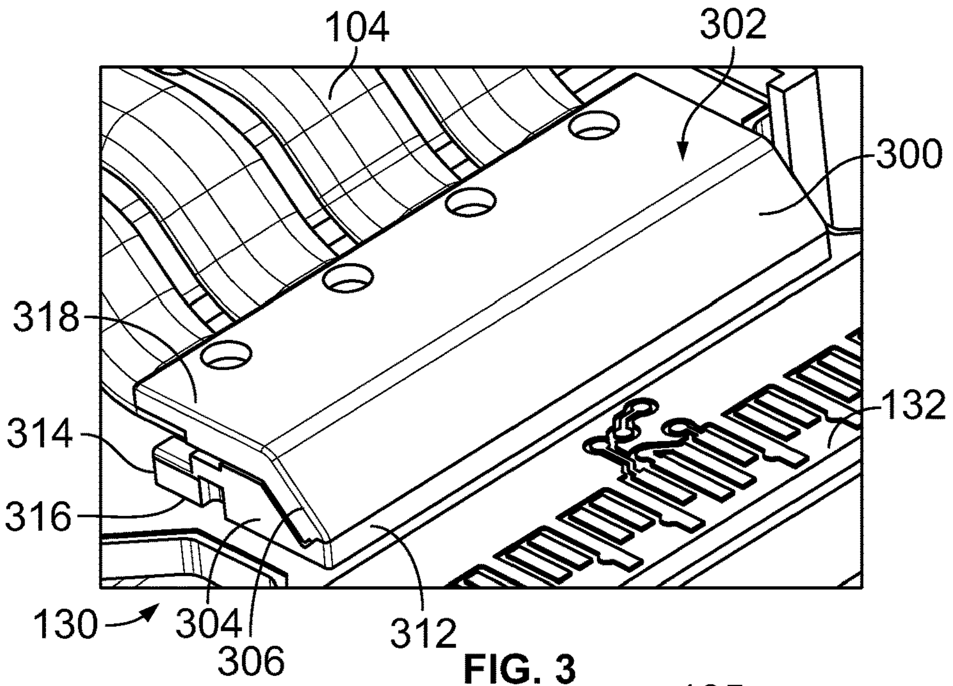
FIG. 3 is a perspective view of a portion of the cable card assembly in accordance with an exemplary embodiment.

FIG. 3 is a perspective view of a portion of the cable card assembly 130 in accordance with an exemplary embodiment. FIG. 3 shows the ground bus 300 surrounding the ends of the twin axial cables 104 and terminated to the circuit card 132. The cable card assembly 130 may have multiple rows of twin axial cables 104 and corresponding ground busses 300 with the twin axial cables 104 in the forward row routed over (for example, flyover) the rearward located ground bus 300. Other arrangements are possible in alternative embodiments.

The ground bus 300 is configured to be coupled to the circuit card 132 to provide electrical shielding along the signal paths. The ground bus 300 provides electrical shielding for signals transmitted between the circuit card 132 and the twin axial cables 104. The ground bus 300 enhances electrical performance of the cable card assembly 130, such as by reducing cross talk. The ground bus 300 includes a shell 302 manufactured from a conductive material, such as a metal material to provide electrical shielding. In various embodiments, the ground bus 300 may be a diecast component. In other various embodiments, the ground bus 300 may be a stamped and formed component. In various embodiments, the ground bus 300 is a multi-piece structure, such as including an inner bus member 304 and an outer bus member 306. The twin axial cables 104 are received between the inner bus member 304 and the outer bus member 306.

The ground bus 300 extends between a front 312 and a rear 314. The rear 314 is configured to face the twin axial cables 104. The ground bus 300 extends between an inner end 316 and an outer end 318. The inner bus member 304 is at the inner end 316 and the outer bus member 306 is at the outer end 318. The ground bus 300 may be oriented such that the inner end 316 is a bottom end and the outer end 318 is a top end. However, other orientations are possible in alternative embodiments.

Figure 4:
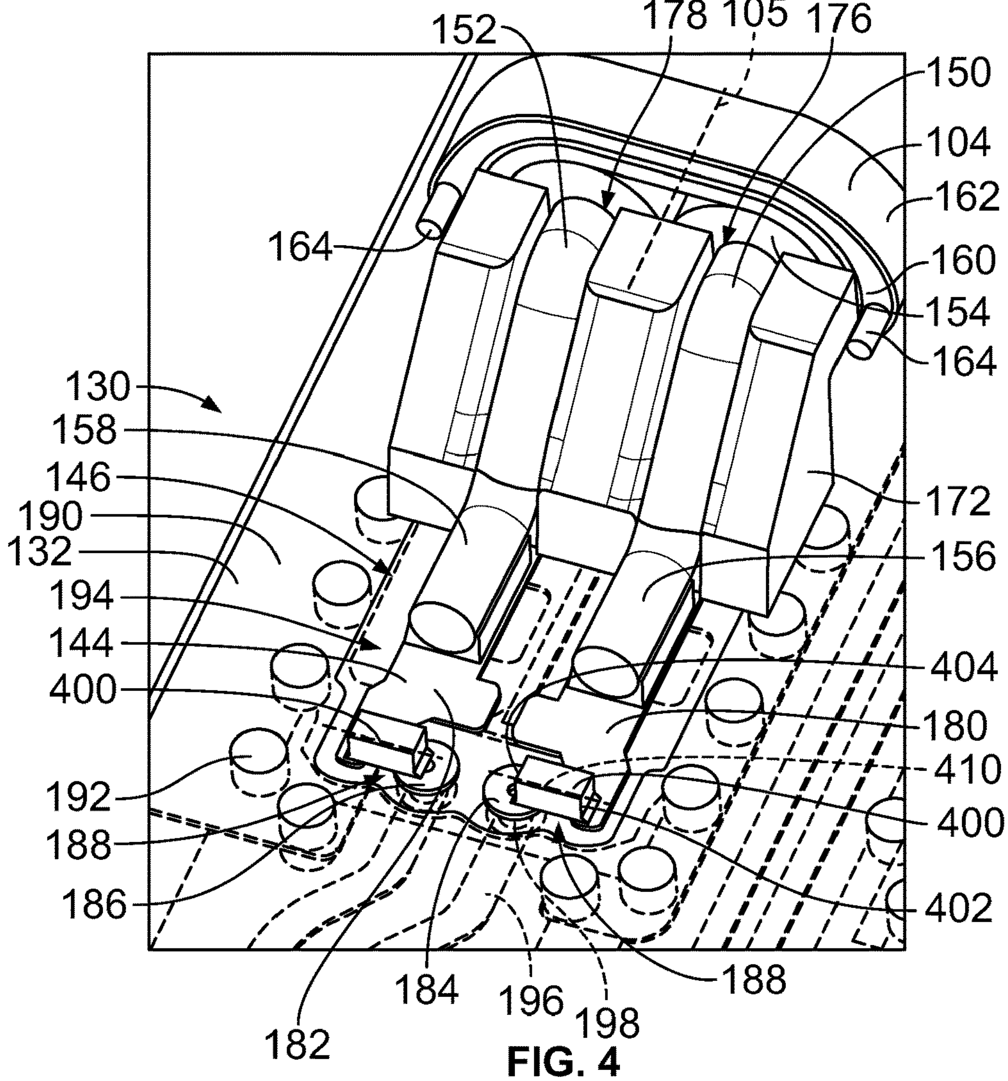
FIG. 4 illustrates a portion of the cable card assembly in accordance with an exemplary embodiment showing one of the twin axial cables coupled to the circuit card at a connection area.

FIG. 4 illustrates a portion of the cable card assembly 130 in accordance with an exemplary embodiment showing one of the twin axial cables 104 coupled to the circuit card 132 at a connection area 146. The ground bus 300 (shown in FIG. 3) is not shown in FIG. 4 to illustrate the termination of the twin axial cable 104 to the circuit card 132. In an exemplary embodiment, the cable card assembly 130 includes capacitors 400 coupled to the circuit card 132 at the connection area 146. The capacitors 400 are provided in the signal transmission lines through the circuit card 132, such as to block DC signals. The capacitors 400 are connected to corresponding circuit conductors 144.

Each twin axial cable 104 includes a pair of signal conductors and a shield structure providing electrical shielding. The twin axial cable 104 extends along a cable axis 105 (for example, centered between the pair of signal conductors). In an exemplary embodiment, the twin axial cable 104 includes a first signal conductor 150 and a second signal conductor 152. The signal conductors 150, 152 may carry differential signals. The signal conductors 150, 152 are configured to be electrically connected to corresponding circuit conductors 144 of the circuit card 132 at the connection area 146.

The cable 104 includes one or more insulators 154 surrounding the signal conductors 150, 152 and a cable shield 160 surrounding the insulators 154. The cable shield 160 provides circumferential shielding around the signal conductors 150, 152. The cable 104 includes a cable jacket 162 surrounding the cable shield 160. In various embodiments, the cable 104 includes one or more drain wires 164 electrically connected to the cable shield 160. In alternative embodiments, the cable 104 is provided without a drain wire.

In an exemplary embodiment, the cable jacket 162, the cable shield 160, and the insulators 154 may be removed (e.g., stripped) to expose portions of the signal conductors 150, 152, which are referred to hereinafter as exposed portions 156, 158, and to expose portions of the drain wires 164. The exposed portions 156, 158 of the signal conductors 150, 152 are configured to be mechanically and electrically coupled (e.g., soldered) to the circuit conductors 144 (or to the contact assembly when utilized). In an exemplary embodiment, the exposed portions 156, 158 extend generally parallel to each other (for example, forward) from the insulators 154 to distal ends. However, the exposed portions 156, 158 may be bent, such as bent inward toward each other (distance between reduced for tighter coupling and smaller trace spacing) and/or outward away from each other and/or may be bent toward the circuit card 132.

In an exemplary embodiment, the exposed portions 156, 158 of the conductors 150, 152 extend into a conductor holder 172. The conductor holder 172 is a dielectric structure, such as a molded plastic element having channels 176, 178 that receive the exposed portions 156, 158 and position the exposed portions 156, 158 relative to each other and relative to the circuit card 132. The conductor holder 172 may be mounted to the circuit card 132 and/or to the ground bus 300. The cable shield 160 does not extend along the exposed portions 156, 158. However, the ground bus 300 may extend along the exposed portions 156, 158 to provide shielding for the exposed portions 156, 158. The ground bus 300 may be shaped and positioned relative to the exposed portions 156, 158 to control impedance along the signal paths. For example, the ground bus 300 may be shaped and positioned relative to the exposed portions 156, 158 to maintain a target impedance along the signal paths (for example, 50 Ohms, 75 Ohms, 100 Ohms, and the like).

In an exemplary embodiment, each connection area 146 receives the corresponding twin axial cable 104 and may receive a pair of the capacitors 400. The ground bus 300 is configured to be coupled to the circuit card 132 surrounding the connection area 146. The connection area 146 is a plurality of the circuit conductors 144. For example, the circuit conductors 144 include a first cable pad 180 and a second cable pad 182. The circuit conductors 144 include a first capacitor pad 184 and a second capacitor pad 186. Gaps 188 are provided between the cable pads 180, 182 and the corresponding capacitor pads 184, 186, respectively. The capacitors 400 are connected to the corresponding cable pads 180, 182 and capacitor pads 184, 186 across the gaps 188. The cable pads 180, 182 may extend generally parallel to each other to define a microstrip signal transmission structure along the surface of the circuit card 132. The cable pads 180, 182 extend to distal ends. The capacitors 400 are terminated to the distal ends of the cable pads 180, 182. In an exemplary embodiment, the capacitor pads 184, 186 are located in line with the distal ends of the cable pads 180, 182. For example, the capacitor pads 184, 186 are located between the distal end of the cable pads 180, 182. The capacitor pads 184, 186 may be located at a common distance from the rear edge of the circuit card 132 as the distal ends of the cable pads 180, 182.

The circuit conductors 144 include one or more ground planes 190 on one or more layers of the circuit card 132. The ground planes 190 generally circumferentially surround the connection area 146. The spacing between the ground planes 190 and the other circuit conductors 144, such as the cable pads 180, 182 and/or the capacitor pads 184, 186 may be tightly controlled for matching and/or for impedance control. For example, the ground plane 190 may be tightly positioned relative to the cable pads 180, 182 and the capacitor pads 184, 186 to provide edge ground coupling to maintain impedance control throughout the structure, such as for low insertion loss and good matching or return loss. The ground planes 190 may be connected by ground vias 192 passing through the circuit card 132. In an exemplary embodiment, a plurality of the ground vias 192 are arranged in a picket fence around the connection area 146. The cable pads 180, 182 and the capacitor pads 184, 186 are arranged in an anti-pad 194 in the ground plane 190. The ground vias 192 substantially surround the anti-pad 194. A break or opening through the fence of ground vias 192 is provided to allow signal traces 196 to exit the connection area 146.

The signal traces 196 may be routed on an interior layer of the circuit card 132. The signal traces 196 may extend parallel to each other to form a differential strip line transmission structure. Signal vias 198 connect the signal traces 196 to the capacitor pads 184, 186. As such, the signal traces 196 are electrically connected to the cable pads 180, 182 through the capacitors 400.

In an exemplary embodiment, the signal conductors 150, 152 of the twin axial cable 104 are terminated directly to the cable pads 180, 182. For example, the exposed portions 156, 158 may be soldered directly to the cable pads 180, 182. However, in alternative embodiments, contacts of the contact assembly (not shown) may be used to electrically connect the signal conductors 150, 152 to the cable pads 180, 182. For example, the contacts may be soldered directly to the cable pads 180, 182 and soldered directly to the exposed portions 156, 158.

In an exemplary embodiment, the capacitor 400 is a Direct-Current (DC) blocking capacitor. Each capacitor 400 extends between a first end 402 and a second end 404. The capacitor 400 may include one or more leads at the first and second ends 402, 404 terminated to (for example, soldered to) the corresponding pads 180, 182, 184, 186. The capacitor 400 extends along a capacitor axis 410 that extends between the first end 402 and the second end 404.

In an exemplary embodiment, the capacitor 400 is oriented perpendicular to the signal transmission line. For example, the capacitor axis 410 is oriented perpendicular to the cable axis 105. The capacitor axis 410 is oriented perpendicular to the cable pads 180, 182. The capacitor axis 410 is oriented perpendicular to the signal traces 196. The capacitors 400 are oriented laterally (for example, perpendicular) relative to the generally parallel oriented signal transmission lines. The arrangement of the pair of the capacitors 400 forms a single ended structure with zero differential coupling due to the orthogonal orientation of the capacitors 400 to the signal transmission lines. In an exemplary embodiment, the capacitor axes 410 of the pair of capacitors 400 are axially aligned with each other. For example, the pair of capacitors 400 are arranged end to end with the first end 402 of one of the capacitors 400 facing the second end 404 of the other capacitor 400. The arrangement of the pair of the capacitors 400 relative to each other (for example, end to end) reduces the risk of the adjacent crosstalk between the capacitors 400. The orientation of the capacitors 400 provides a compact arrangement within the connection area 146, which may allow compression or shortening of the connection area 146. For example, the overall depth of the connection area 146 from the rear edge of the circuit card 132 may be reduced by orienting the capacitors 400 perpendicular to the signal transmission lines. Reducing the length of the connection area 146 may reduce the overall length of the circuit card 132 and/or may allow the use of a smaller ground bus 300. For example, the overall size of the cavity of the ground bus 300 surrounding the connection area 146 may be reduced. The smaller ground bus reduces possible cavity resonances that would affect RF performance. In the illustrated embodiment, the capacitors 400 are turned inward to the differential signals structure. However, in alternative embodiments, the capacitors 400 may be turned outward, wherein the capacitor pads 184, 186 may be located outside of the distal ends of the cable pads 180, 182.

In alternative embodiments, the capacitors 400 may be oriented at other angles relative to each other and relative to the signal transmission lines. For example, the capacitors 400 may be parallel to the cable axis 105 and the signal transmission lines. In other embodiments, the capacitors 400 may be at other angles, such as 45° relative to the cable axis 105 and/or the signal transmission lines.

Figure 5:
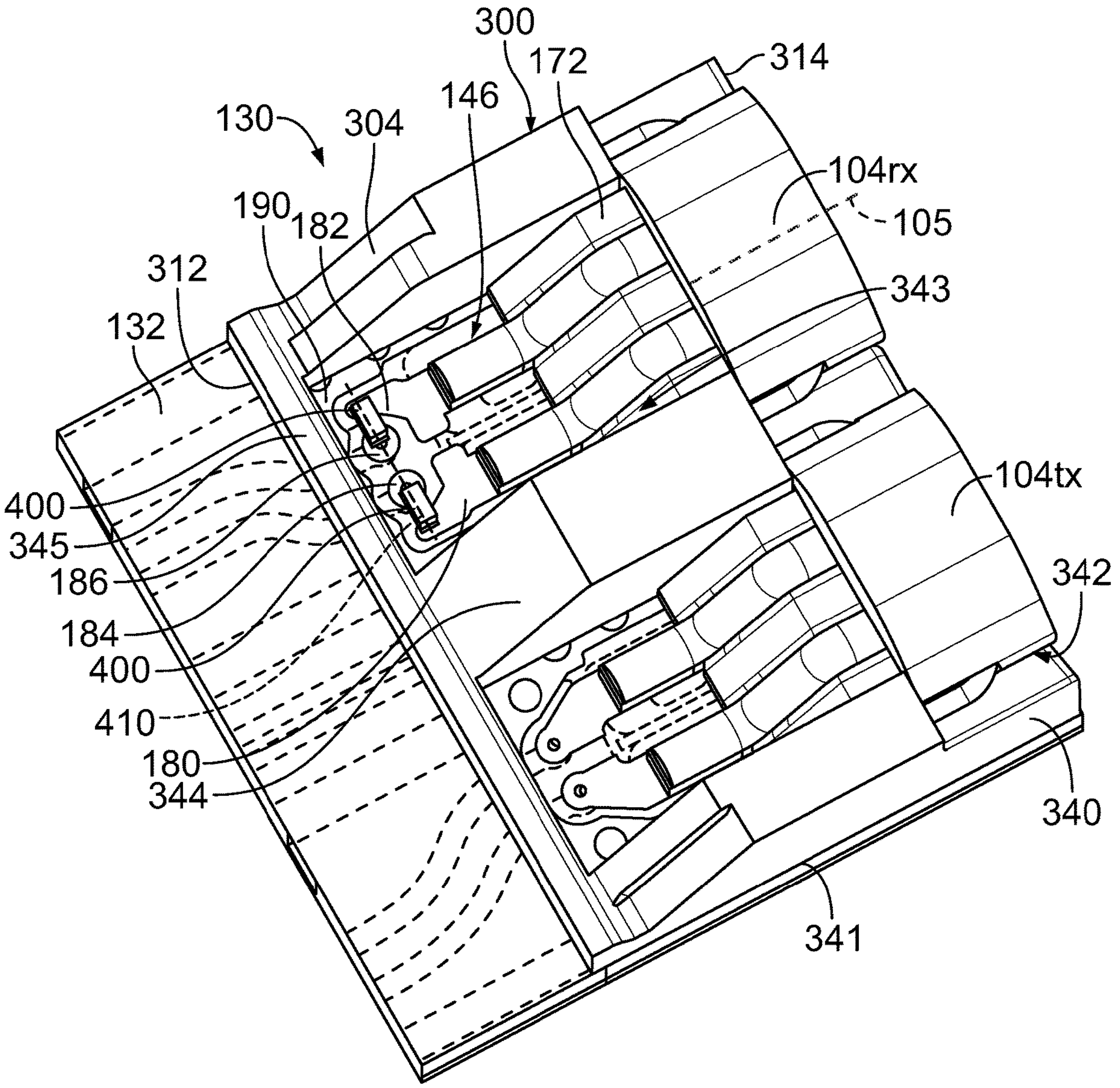
FIG. 5 illustrates a portion of the cable card assembly in accordance with an exemplary embodiment showing two of the twin axial cables coupled to the circuit card at a connection area.

FIG. 5 illustrates a portion of the cable card assembly 130 in accordance with an exemplary embodiment showing two of the twin axial cables 104 coupled to the circuit card 132 at a connection area 146. One of the twin axial cables 104 is a receive twin axial cable 104*rx* while the other twin axial cable 104 is a transmit twin axial cable 104*tx*. The receive twin axial cable 104*rx* includes the capacitors 400 in the corresponding signal transmission lines along the circuit card 132. The transmit twin axial cable 104*tx* does not include the capacitors 400.

A portion of the ground bus 300 is shown in FIG. 5 to illustrate the location of the ground bus 300 relative to the twin axial cables 104 and the capacitors 400 on the circuit card 132 at the connection area 146. FIG. 5 shows the inner bus member 304. The outer bus member 306 (shown in FIG. 3) is used to cover the inner bus member 304, the twin axial cables 104 and the capacitors 400. In an exemplary embodiment, the ground bus 300 is electrically connected to the ground plane 190. The ground bus 300 may be soldered to the ground plane 190. In alternative embodiments, the ground bus 300 may be press-fit into openings (not shown) in the circuit card 132 to mechanically and electrically connect the ground bus 300 to the circuit card 132.

The ground bus 300 extends between the front 312 and the rear 314. The ground bus 300 is manufactured from a conductive material, such as a metal material. In various embodiments, the ground bus 300 is a diecast member. In other various embodiments, the ground bus 300 may be a plated plastic member or a stamped and formed member. The ground bus 300 is configured to provide shielding for the twin axial cables 104 and the capacitors 400.

The ground bus 300 includes a base 340 having a bottom 341 configured to be mounted to the circuit card 132. The ground bus 300 includes cable cradles 342 configured to receive corresponding twin axial cables 104. The cable cradles 342 support the twin axial cables 104 for termination to the circuit card 132 (or the contact assembly when utilized). In an exemplary embodiment, the ground bus 300 includes pockets 343 that receive the corresponding conductor holders 172 and the ends of the twin axial cables 104. The capacitors 400 are located in the pockets 343. The ground bus 300 includes separating walls 344 between the pockets 343. Optionally, the separating walls 344 may be connected by a front wall 345 at the front of the ground bus 300. The front wall 345 is located forward of the pockets 343. The front wall 345 provides shielding for the twin axial cables 104 and the capacitors 400 in the pockets 343. The separating walls 344 provide shielding between the pockets 343. The separating walls 344 position the conductor holders 172 relative to each other. The separating walls 344 may be located between respective cable cradles 342. The ground bus 300 may include locating features (for example, ribs, tabs, slots, pins, and the like) along the separating walls 344 for positioning and/or securing the outer bus member 306 to the inner bus member 304.

In an exemplary embodiment, the capacitors 400 are turned inward toward each other within the pocket 343. The capacitors 400 are oriented perpendicular to the cable axis 105. The capacitors 400 are oriented parallel to the front wall 345. The capacitor axes 410 of the pair of capacitors 400 are aligned with each other parallel to the front wall 345 and the rear edge of the circuit card 132. The orientation of the capacitors 400 provides a compact arrangement within the connection area 146. For example, the capacitor pads 184, 186 are aligned with the distal ends of the cable pads 180, 182 (for example, side-by-side rather than front-to-rear), such as at a common distance from the rear edge of the circuit card 132. As such, the size of the connection area 146 is smaller (for example, shorter), allowing the front wall 345 to be moved rearward. In various embodiments, the overall length of the connection area 146 may be reduced by 1 mm or more by positioning the pads 180, 182, 184, 186 side-by-side rather than front-to-rear and orienting the capacitors 400 perpendicular to the signal transmission paths. As such, the overall length of the ground bus 300 may be reduced. The size of the pocket 343 is also reduced (for example, shortened). The reduced overall size of the pocket 343 of the ground bus 300 surrounding the connection area 146 reduces possible cavity resonances that would affect RF performance.

Figure 6:
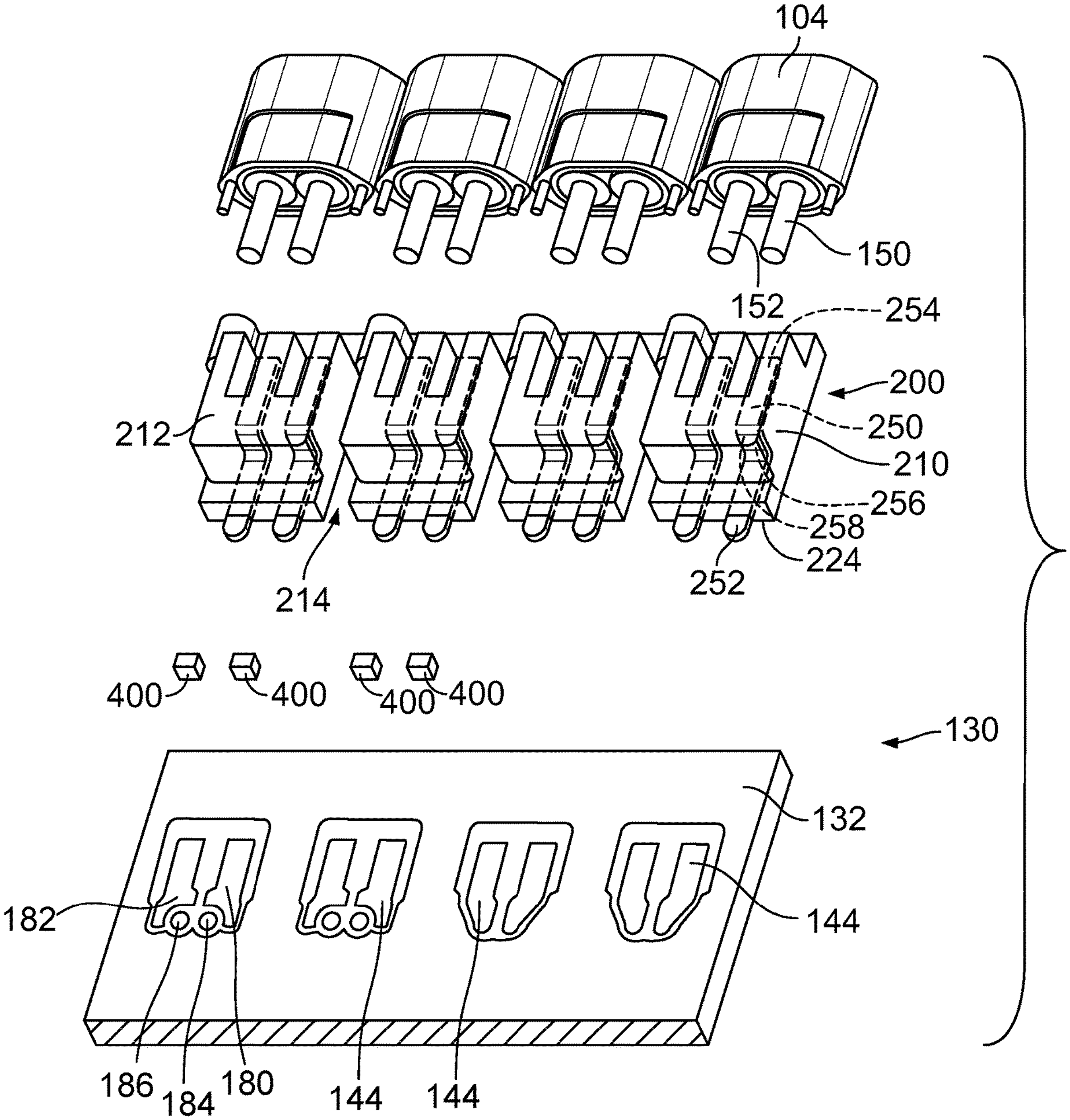
FIG. 6 is an exploded view of a portion of the cable card assembly in accordance with an exemplary embodiment showing a plurality of the twin axial cables, a contact assembly, the circuit card, and a plurality of the capacitors.

FIG. 6 is an exploded view of a portion of the cable card assembly 130 in accordance with an exemplary embodiment showing a plurality of the twin axial cables 104, a contact assembly 200, the circuit card 132, and a plurality of the capacitors 400. During assembly, the contact assembly 200 is used to electrically connect the twin axial cables 104 and the circuit card 132 rather than direct termination of the twin axial cables 104 to the circuit card 132. The contact assembly 200 provides a connectorized interface between the twin axial cables 104 and the circuit card 132. The contact assembly 200 enhances electrical performance of the cable card assembly 130, such as by controlling routing of the signal paths, controlling the dielectric material surrounding the signal paths, and providing robust interfaces between the circuit card 132 and the twin axial cables 104.

The contact assembly 200 includes a contact holder 210 holding a plurality of signal contacts 250. In an exemplary embodiment, the signal contacts 250 are arranged in pairs. The contact holder 210 is manufactured from a dielectric material, such as a plastic material. The contact holder 210 is formed around the signal contacts 250 in various embodiments. For example, the signal contacts 250 may be formed as a lead frame and the contact holder 210 is overmolded around the lead frame. However, in alternative embodiments, the contact holder 210 may be pre-formed and the signal contacts 250 may be loaded or stitched into the contact holder 210. In an exemplary embodiment, the contact holder 210 is a single, unitary piece molded around all of the signal contacts 250. However, in alternative embodiments, the contact holder 210 may be formed by multiple pieces or holder elements each holding corresponding signal contacts 250, such as each holding the corresponding pair of the signal contacts 250.

The contact holder 210 includes contact blocks 212 separated by gaps 214. Each contact block 212 holds the corresponding signal contacts 250, such as each holding the corresponding pair of the signal contacts 250. The gaps 214 separate portions of the contact blocks 212. The gaps 214 are configured to receive portions of the ground bus 300 to allow electrical shielding between the contact blocks 212. In various embodiments, the contact blocks 212 may be connected by a connecting wall or portion of the contact holder 210, such as along the bottom or rear of the contact holder 210. However, in alternative embodiments, the contact holder 210 may be provided without the connecting wall. Rather, each contact block 212 is separate and discrete from the other contact blocks 212.

The signal contacts 250 are routed through the contact holder 210 to provide signal paths between the signal conductors 150, 152 and the circuit card 132. In an exemplary embodiment, the signal contacts 250 are stamped and formed contacts. In various embodiments, the signal contacts 250 may be formed as a lead frame on a carrier strip (not shown), which is later removed after the contact holder 210 is overmolded around the signal contacts 250.

Each signal contact 250 includes a base tab 252 and a mating tab 254. The base tab 252 may be a lower solder tab and the mating tab 254 may be an upper solder tab. The signal contact 250 includes a transition portion 256 between the base tab 252 and the mating tab 254. The transition portion 256 includes one or more bends 258 to transition between the base tab 252 and the mating tab 254. The transition portion 256 transitions out of plane relative to the base tab 252 and the mating tab 254. For example, the transition portion 256 may extend generally perpendicular to the base tab 252 and generally perpendicular to the mating tab 254. The contact assembly 200 may be oriented such that the transition portion 256 extends vertically.

The base tab 252 is configured to be terminated to the corresponding circuit conductor 144, such as the cable pads 180, 182, of the circuit card 132. In various embodiments, the base tab 252 is a solder tab configured to be soldered to the circuit conductor 144. However, in alternative embodiments, the base tab 252 may be terminated by other processes, such as having a compliant pin that is press-fit into the circuit card 132. In an exemplary embodiment, the base tab 252 extends parallel to the inner end 224 of the contact holder 210. Each of the base tabs 252 are generally coplanar and may be co-planer with the inner end 224 of the contact holder 210. The contact assembly 200 may be oriented such that the base tabs 252 extend horizontally.

The mating tab 254 is configured to be terminated to the corresponding signal conductor 150, 152. In various embodiments, the mating tab 254 is a pad configured to be soldered or laser welded to the signal conductor 150, 152. However, in alternative embodiments, the mating tab 254 may be terminated by other processes, such as having a crimp barrel that is crimped to the signal conductor 150, 152. In an exemplary embodiment, the mating tab 254 extends parallel to the inner end 224. Each mating tab 254 may be generally coplanar. The contact assembly 200 may be oriented such that the mating tabs 254 extend horizontally.

The capacitors 400 are configured to be coupled to the circuit card 132 forward of the contact assembly 200. The capacitors 400 may be coupled to the cable pads 180, 182 and the capacitor pads 184, 186 forward of the ends of the base tabs 252. In other embodiments, ends of the capacitors 400 may be coupled directly to the base tabs 252. In an exemplary embodiment, the capacitors 400 may be oriented perpendicular to the contacts 250. For example, the capacitor axes 410 (shown in FIG. 5) of the capacitors 400 may be oriented perpendicular to the base tabs 252.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A cable card assembly for an electrical connector comprising:

a circuit card having an upper surface and a lower surface, the circuit card having a cable end and a mating end, the circuit card having circuit conductors defining signal transmission paths through the circuit card, the circuit conductors include cable pads at the cable end and capacitor pads adjacent the corresponding cable pads;

twin axial cables electrically coupled to the circuit card, each twin axial cable including a pair of signal conductors and a cable shield surrounding the pair of signal conductors to provide electrical shielding for the corresponding signal conductors, the signal conductors configured to be electrically connected to the circuit conductors of the circuit card, the twin axial cable extending along a cable axis; and capacitors coupled to the circuit card, each capacitor connected between the corresponding cable pad and the corresponding capacitor pad on the circuit card, the capacitor being oriented perpendicular to the corresponding cable axis.

2. The cable card assembly of claim 1, wherein each capacitor extends between a first end and a second end, the first end being coupled to the cable pad, the second end being coupled to the capacitor pad.

3. The cable card assembly of claim 2, wherein the capacitor extends along a capacitor axis extending between the first end and the second end, the capacitor axis being oriented perpendicular to the cable axis.

4. The cable card assembly of claim 1, wherein the capacitors are aligned with each other end-to-end at a common distance from the cable end of the circuit card.

5. The cable card assembly of claim 1, wherein the cable pad and the contact pad are aligned with each other at a common distance from the cable end of the circuit card.

6. The cable card assembly of claim 1, wherein pairs of the capacitor pads are located between pairs of the cable pads to receive corresponding pairs of the capacitors.

7. The cable card assembly of claim 1, further comprising a contact assembly coupled to the circuit card and coupled to the twin axial cables, the contact assembly including a contact holder holding signal contacts, each signal contact including a base tab and a mating tab, the base tab being terminated to the corresponding cable pad, the mating tab being terminated to the corresponding signal conductor.

8. The cable card assembly of claim 1, further comprising a ground bus mounted to the circuit card, the ground bus being electrically connected to the cable shields to electrically connect the cable shields of the twin axial cables, the ground bus being electrically connected to a ground plane of the circuit card, the ground bus including a shell having pockets and separating walls between the pockets, each pocket receiving an end of the corresponding twin axial cable and a pair of the corresponding capacitors, the separating walls providing shielding between the twin axial cables and between the pairs of the capacitors.

9. The cable card assembly of claim 8, wherein the shell includes a front wall connecting the separating walls enclosing the pockets, the capacitors be located in the pockets rearward of the front wall.

10. A cable card assembly for an electrical connector comprising:

a circuit card having an upper surface and a lower surface, the circuit card having a cable end and a mating end, the circuit card having circuit conductors defining signal transmission paths through the circuit card, the circuit conductors including cable pads at the cable end and capacitor pads adjacent the corresponding cable pads, the circuit card having a ground plane;

twin axial cables electrically coupled to the circuit card, each twin axial cable including a pair of signal conductors and a cable shield surrounding the pair of signal conductors to provide electrical shielding for the corresponding signal conductors, the signal conductors configured to be electrically connected to the circuit conductors of the circuit card, the twin axial cable extending along a cable axis;

a ground bus mounted to the circuit card, the ground bus being electrically connected to the cable shields to electrically connect the cable shields of the twin axial cables, the ground bus being electrically connected to the ground plane of the circuit card, the ground bus including a shell having pockets and separating walls between the pockets, each pocket receiving an end of the corresponding twin axial cable, the separating walls providing shielding between the ends of the twin axial cables; and capacitors coupled to the circuit card in the pockets, each capacitor connected between the corresponding cable pad and the corresponding capacitor pad, the capacitors being surrounded by the shell to provide shielding for the capacitors.

11. The cable card assembly of claim 10, wherein the capacitors are oriented perpendicular to the twin axial cables.

12. The cable card assembly of claim 10, wherein the shell includes a front wall connecting the separating walls enclosing the pockets, the capacitors be located in the pockets rearward of the front wall.

13. The cable card assembly of claim 10, wherein the capacitors are arranged in pairs in the pockets.

14. The cable card assembly of claim 10, wherein each capacitor extends between a first end and a second end, the first end being coupled to the cable pad, the second end being coupled to the capacitor pad, the capacitor extends along a capacitor axis extending between the first end and the second end, the capacitor axis being oriented perpendicular to the cable axis.

15. The cable card assembly of claim 10, wherein the capacitors are aligned with each other end-to-end at a common distance from the cable end of the circuit card.

16. An electrical connector comprising:

a housing having walls forming a cavity, the housing having a mating end configured to be mated with a second electrical connector; and a cable card assembly received in the cavity of the housing, the cable card assembly including a circuit card, twin axial cables electrically connected to the circuit card, capacitors electrically connected to the circuit card, and a ground bus coupled to the circuit card over ends of the twin axial cables and the capacitors to provide electrical shielding for the twin axial cables and the capacitors, the circuit card having an upper surface and a lower surface, the circuit card having a cable end and a mating end, the circuit card having circuit conductors defining signal transmission paths through the circuit card, each circuit conductor including a cable pad at the cable end and a capacitor pad adjacent the corresponding cable pad, the circuit card having a ground plane, each twin axial cable including a pair of signal conductors and a cable shield surrounding the pair of signal conductors to provide electrical shielding for the corresponding signal conductors, the signal conductors configured to be electrically connected to the circuit conductors of the circuit card, the ground bus being electrically connected to the cable shields to electrically connect the cable shields of the twin axial cables, the ground bus being electrically connected to the ground plane of the circuit card, the ground bus including a shell having pockets and separating walls between the pockets, each pocket receiving an end of the corresponding twin axial cable and the corresponding capacitors, the separating walls providing shielding between the ends of the twin axial cables and the capacitors, each capacitor connected between the corresponding cable pad and the corresponding capacitor pad.

17. The electrical connector of claim 16, wherein the capacitors are oriented perpendicular to the twin axial cables.

18. The electrical connector of claim 16, wherein each capacitor extends between a first end and a second end, the first end being coupled to the cable pad, the second end being coupled to the capacitor pad, the capacitor extends along a capacitor axis extending between the first end and the second end, the capacitor axis being oriented perpendicular to the cable axis.

19. The electrical connector of claim 16, wherein the mating end of the housing is provided at a bottom of the housing, the circuit card provided at the bottom, the mating conductors provided at the lower surface of the circuit card along the bottom of the housing, the mating end of the housing configured to be plugged into a socket of the second electrical connector to mate with the mating conductors with mating contacts of the second electrical connector in the socket.

20. The electrical connector of claim 16, wherein the mating end of the circuit card is provided at a front edge of the circuit card configured to be plugged into a card slot at a mating end of the second electrical connector.

* * * * *